(12) United States Patent
Baker

(10) Patent No.: US 11,086,035 B2
(45) Date of Patent: Aug. 10, 2021

(54) CLUSTERING ALGORITHM FOR GEOSCIENCE DATA FUSION

(71) Applicant: Yulia Baker, Houston, TX (US)

(72) Inventor: Yulia Baker, Houston, TX (US)

( * ) Notice: Subject to any disclaimer, the term of this patent is extended or adjusted under 35 U.S.C. 154(b) by 768 days.

(21) Appl. No.: 15/380,117

(22) Filed: Dec. 15, 2016

(65) Prior Publication Data

US 2017/0192115 A1    Jul. 6, 2017

Related U.S. Application Data

(60) Provisional application No. 62/273,080, filed on Dec. 30, 2015.

(51) Int. Cl.
  *G01V 1/30*      (2006.01)
  *G06N 3/08*      (2006.01)
  *G06N 20/00*     (2019.01)

(52) U.S. Cl.
  CPC .............. *G01V 1/307* (2013.01); *G01V 1/301* (2013.01); *G06N 3/088* (2013.01); *G06N 20/00* (2019.01); *G01V 2210/61* (2013.01); *G01V 2210/632* (2013.01); *G01V 2210/66* (2013.01)

(58) Field of Classification Search
  CPC .... G01V 1/301; G01V 1/307; G01V 2210/61; G01V 2210/632; G01V 2210/66
  See application file for complete search history.

(56) References Cited

U.S. PATENT DOCUMENTS

| 4,694,404 | A | 9/1987 | Meagher |
| 6,950,786 | B1 | 9/2005 | Sonneland et al. |
| 2005/0120013 | A1 | 6/2005 | Chang et al. |
| 2007/0226158 | A1 | 9/2007 | Wornow et al. |
| 2010/0274543 | A1* | 10/2010 | Walker .................. G01V 99/00 703/6 |
| 2011/0218737 | A1 | 9/2011 | Gulati |

(Continued)

FOREIGN PATENT DOCUMENTS

WO    WO 2012/106201    8/2012

OTHER PUBLICATIONS

Choudhary et al. ("Generation of Multiple History Matched Models Using Multistart Optimization Technique", Proceedings of the 10th SEGJ International Symposium, Kyoto, Japan, Nov. 20-22, 2011, pp. 1-14) (Year: 2011).*

(Continued)

*Primary Examiner* — Kakali Chaki
*Assistant Examiner* — Robert Lewis Kulp
(74) *Attorney, Agent, or Firm* — ExxonMobil Upstream Research Company, Law Department

(57) ABSTRACT

A method, including: performing, with a computer, within-seismic-attribute clustering for each of a plurality of seismic attribute datasets for N different attributes, N being greater than or equal to two; identifying an anchor attribute and N-1 subordinate attributes from the N different attributes; linking, with a computer, objects within the seismic attribute data sets corresponding to the N-1 subordinate attributes to related objects within the seismic attribute data set corresponding to the anchor attribute; and identifying, with a computer, cross-attribute clusters, wherein the objects of any subordinate attribute that are linked to a same object of the anchor attribute are part of a single cross-attribute cluster.

9 Claims, 6 Drawing Sheets

(56) References Cited

U.S. PATENT DOCUMENTS

| | | | |
|---|---|---|---|
| 2012/0090834 A1* | 4/2012 | Imhof | G06K 9/00536 166/250.01 |
| 2014/0278115 A1* | 9/2014 | Bas | G01V 1/30 702/14 |
| 2015/0253445 A1 | 9/2015 | Luo et al. | |

OTHER PUBLICATIONS

Ester, Martin; et al. (1996), "A Density-Based Algorithm for Discovering Clusters in Large Spatial Databases with Noise", Proc. of 2nd Intl. Conf. on Knowledge Discovery and Data Mining; 6 pages.

MacQueen, J. B. (1967). "Some Methods for classification and Analysis of Multivariate Observations". Proceedings of 5th Berkeley Symposium on Mathematical Statistics and Probability 1. University of California Press. pp. 281-297. MR 0214227. Zbl 0214. 46201, Retrieved Apr. 7, 2009.

Steinhaus, H. (1957). A—Original Article "Sur la division des corps matériels en parties". Bull. Acad. Polon. Sci. (in French) 4 (12): 801-804. MR 0090073, Zbl 0079.16403 B—Translation by Google Translate from original article in pdf format; pp. 801-804.

Simoudis, Evangelos, et al. (1996) "A Density-Based Algorithm for Discovering Clusters in Large Spatial Databases with Noise", KDD-96 Proceedings. Copyright 1996, AAAI (www.aaai.org) pp. 226-231.

Meagher, Donald J.R. (1980) "Octree Encoding: A New Technique for the Representation, Manipulation and Display of Arbitrary 3-D Objects by Computer", Technical Report IPL-TR-80-111 (Oct. 1980)—Image Processing Library, Electrical and Systems Engineering Department Rensselaer Polytechnic Institute, Troy, New York 12181, 121 pages.

\* cited by examiner

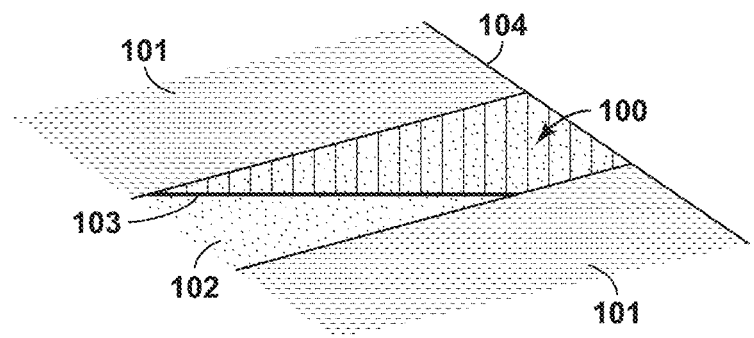
FIG. 1
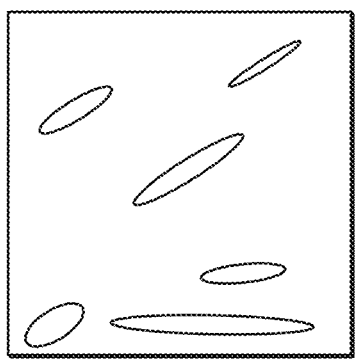 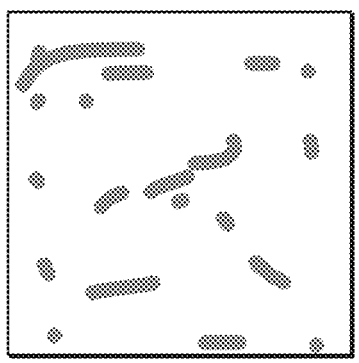 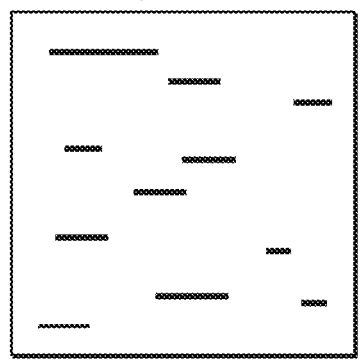
FIG. 2A  FIG. 2B  FIG. 2C
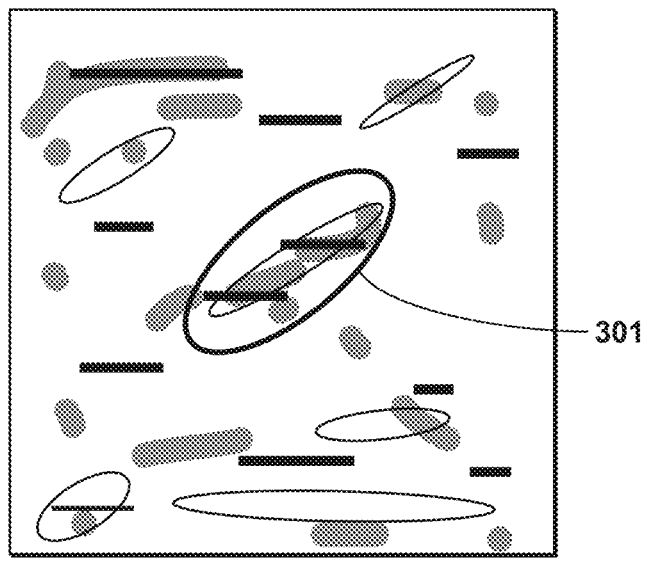
FIG. 3

CLUSTERING ALGORITHM FOR GEOSCIENCE DATA FUSION

CROSS-REFERENCE TO RELATED APPLICATION

This application claims the benefit of U.S. Provisional Patent Application 62/273,080 filed Dec. 30, 2015 entitled A CLUSTERING ALGORITHM FOR GEOSCIENCE DATA FUSION, the entirety of which is incorporated by reference herein.

FIELD OF THE INVENTION

Exemplary embodiments described herein pertain generally to the field of geophysical prospecting, and more particularly to the identification of regions in the subsurface that may be petroleum reservoirs.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Petroleum is found in underground reservoirs. The petroleum industry seeks to efficiently identify untapped petroleum reservoirs, which are often also called 'hydrocarbon' reservoirs. Seismic data are often used to help locate new hydrocarbon reservoirs. Seismic data are images of the subsurface that are made using the reflections of seismic waves that have been propagated into the earth. In a typical seismic survey, seismic waves are generated by a source positioned at a desired location. As the source generated waves propagate through the subsurface, some of the energy reflects from subsurface interfaces and travels back to the surface, where it is recorded by the receivers.

Seismic interpreters are geoscientists who use seismic data to help describe layers and geologic structures in the subsurface. One of seismic interpreters' primary jobs is to identify regions in the subsurface that have a relatively high likelihood of being petroleum reservoirs. Conceptually, interpreters are trying to find trapped accumulations of hydrocarbons. A schematic diagram of an exemplary hydrocarbon reservoir 100 (vertically stripped region) is outlined in FIG. 1. The hydrocarbon reservoir 100 is an area under closure within a sandy reservoir layer 102, enclosed by a sealing fault 104 and shaley layers 101; the oil-water contact 103 is the lower boundary of the hydrocarbon accumulation.

In order to identify prospective regions, seismic interpreters comb through and compare many different seismic datasets, which are also known as seismic data 'volumes' because the dataset stores information about a three-dimensional volume under the surface of the Earth. As the seismic interpreters review the multiple seismic data volumes they look for subtle variations that indicate changes in rock and fluid properties of the subsurface material. Sometimes, seismic data are reprocessed to generate seismic attribute volumes. A seismic attribute is a piece of data that is associated with a certain feature of the subsurface (e.g., fluid content, rock texture, geometry of an interface between two different types of rock; refer to FIGS. 2A-C). More particularly, a seismic attribute, sometimes referred to as a "feature" in computer vision and pattern recognition literature, is a measureable property or derivative of seismic data used to highlight or identify areas or objects of geological or geophysical interest (e.g., the presence of hydrocarbons). These attributes are based on different characteristics of component seismic datasets. Attributes often correlate with some physical property of interest (e.g., acoustic impedance) and help geoscientists to see patterns that otherwise might go unnoticed. Such attributes can represent a transformation of seismic data to a form that is more useful to guide the search for hydrocarbon accumulations or indicate conditions that are potentially favorable to the accumulation of hydrocarbons. Different seismic attribute datasets are generated by processing the raw seismic reflection data in different ways.

In regions of the subsurface that are likely to be hydrocarbon reservoirs, seismic attributes have specific, geologically relevant spatial and contextual relationships. Building upon the example of the schematic attributes shown in FIGS. 2A-C, in a location where a hydrocarbon reservoir exists, we would expect to see reservoir rock (FIG. 2A) spatially coinciding with an attribute that reflects a change in fluid content (FIG. 2B); we would further expect one or two flat events (FIG. 2C) within the boundary of the reservoir, corresponding to the locations of the gas-oil fluid contact and/or the oil-water fluid contact. These geologically relevant spatial relationships are shown schematically in FIG. 3, in which a likely location of a hydrocarbon reservoir is identified by circle 301.

Standard methods for identification of prospective hydrocarbon reservoirs using multiple (≥2) seismic attribute datasets are time and work-intensive. An interpreter must manually scroll through multiple attribute datasets, each of which is extremely large (up to 100 GBs). As the interpreter reviews works, he or she must keep in mind subtle spatial variation in each of the many relevant attributes and mentally track the physical location and geologic context of all attribute objects.

A previously proposed automated approach is to use a graphical model as an integrator of different attribute data (see, for example, U.S. Patent Application Publication 2014/0278115, titled "Context Based Geo-Seismic Object Identification). Other methods for data fusion use weighted sums of normalized attribute values, such as the use of a Bayesian Belief Network (BBN) (see, for example, U.S. Pat. No. 7,743,006, titled "Bayesian network triads for geologic and geophysical applications") but such methods require that features within different seismic attribute volumes be spatially collocated.

SUMMARY

A method, including: performing, with a computer, within-seismic-attribute clustering for each of a plurality of seismic attribute datasets for N different attributes, N being greater than or equal to two; identifying an anchor attribute and N−1 subordinate attributes from the N different attributes; linking, with a computer, objects within the seismic attribute data sets corresponding to the N−1 subordinate attributes to related objects within the seismic attribute data set corresponding to the anchor attribute; and identifying, with a computer, cross-attribute clusters, wherein the objects of any subordinate attribute that are linked to a same object of the anchor attribute are part of a single cross-attribute cluster.

In the method, the performing within-seismic attribute clustering can include obtaining a plurality of seismic attribute objects that each include one or more clusters of voxels, wherein the voxels are clustered according to a clustering algorithm that groups the voxels in each of the plurality of seismic attribute datasets into subsets that include voxels that are near to each other as defined by a proximity measure.

In the method, the linking can be based on a proximity measure between the objects within the seismic attribute data sets corresponding to the N−1 subordinate attributes and the related objects within the seismic attribute data set corresponding to the anchor attribute.

In the method, the anchor attribute can be identified based on at least one of a quantifiable contextual relationship between the anchor attribute and each of the N−1 subordinate attributes, wherein the anchor attribute is identified from the N attributes based at least on spatial smoothness of the anchor attribute, continuity of the anchor attribute, signal-to-noise ratio of the anchor attribute, or spatial coincidence between the anchor attribute and a potential hydrocarbon reservoir.

In the method, a function describing the proximity measure can change between anchor attribute object and subordinate attribute object pairings.

In the method, the linking can include performing N−1 iterations of pairwise cross-attribute clustering or classification between each of the N−1 subordinate attributes and the anchor attribute.

In the method, the pairwise cross-attribute clustering or classification can utilize a proximity metric that describes a contextual relationship between each subordinate-anchor attribute pair.

In the method, the linking can include separately linking each object of the anchor attribute that is proximal to the objects within the seismic attribute data sets corresponding to the N−1 subordinate attributes according to the proximity metric that is a function of a respective subordinate attribute and contextual information.

In the method, a function describing the proximity metric can change between anchor attribute object and subordinate attribute object pairings.

In the method, the linking can include using representative points of the objects for the N−1 subordinate attributes and the objects of the anchor attribute for computation of the proximity metric.

In the method, the representative points can be centroids based on shapes of the objects for the N−1 subordinate attributes and shapes of the objects of the anchor attribute.

In the method, the linking can include partitioning each object of the anchor attribute into a plurality of sub-objects, using a centroid of a shape of each of the sub-objects as a representative point, and computing the proximity metric for each of the sub-objects using the representative point.

In the method, the objects of the N−1 subordinate attributes can be considered to be linked to the object of the anchor attribute in response to the distance metric being smaller than a predetermined threshold.

In the method, each cross-attribute cluster can be an object that includes a set of attribute objects that share contextual relationships that are consistent with prospectively for hydrocarbons.

The method can further include: performing a seismic acquisition, results from which are used to generate the plurality of seismic attribute data sets; using the cross-attribute clusters to identify subsurface regions that may be a hydrocarbon reservoir; and drilling a well for extracting hydrocarbons from the hydrocarbon reservoir.

The method can further include generating a subsurface image that includes linked cross-feature hierarchical clusters of attributes corresponding to the plurality of seismic attribute data sets.

In the method, the representative points can be a voxel contained within each of the objects that has a highest value of a given attribute.

In the method, the within-seismic-attribute clustering can include using a classification algorithm.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 1 is a schematic diagram of an exemplary hydrocarbon reservoir.

FIGS. 2A, 2B and 2C illustrate examples of seismic attributes.

FIG. 3 is a schematic diagram of a hypothetical hydrocarbon reservoir and the corresponding spatial relationships between the seismic attributes schematically diagramed in FIGS. 2A, 2B, and 2C.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement is an automated method for using multiple seismic attributes as inputs to generating a set of 'prospective' objects (regions) in the subsurface. Features of the components of each object can be used to rank the regions in order of prospectively in which the region most likely to contain a hydrocarbon reservoir receives the highest ranking. The present technological advancement uses seismic data as input and provides a method for achieving what others have called 'data fusion' (i.e., integration of information across different sources of data). The output from the present technological advancement can be a set of prospective regions in a seismic dataset that can be ranked in order of their potential for being hydrocarbon reservoirs.

The present technological advancement is an improvement upon the graphical modeling approach because the present technological advancement is robust to noisy input datasets and missing data. The present technological advancement improves upon weighted averaging schemes because it takes into account geologically meaningful spatial relationships between objects in different seismic attribute volumes. The present technological advancement is easily modifiable across environments of sediment deposition, and it is computationally efficient and scalable.

Figure 4A:
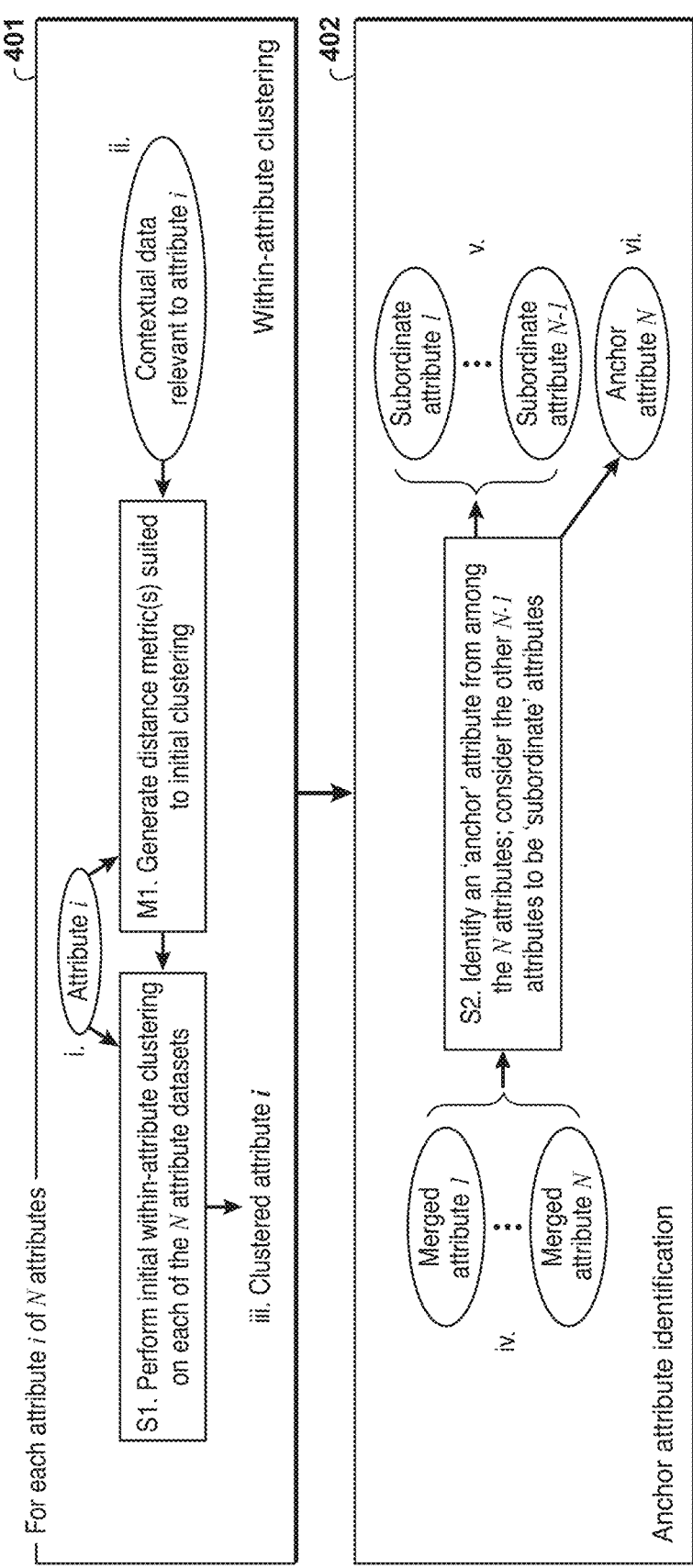
FIGS. 4A and 4B illustrate an exemplary method for geoseismic cross-attribute clustering.
Figure 4B:
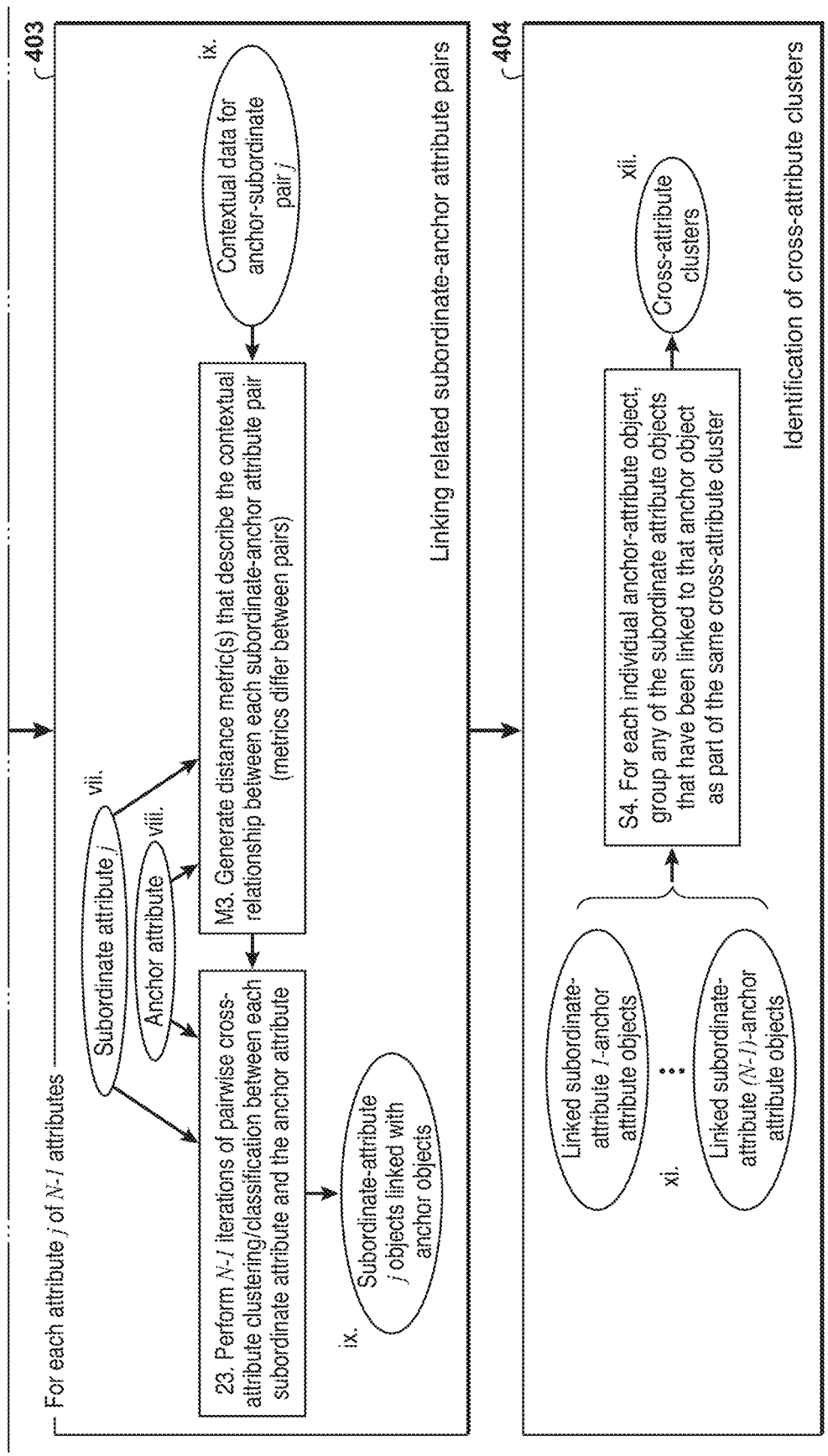

FIGS. 4A and 4B (collectively referred to as FIG. 4 hereafter) illustrate an exemplary method for geoseismic cross-attribute clustering. In FIG. 4, input, intermediate-product, and output datasets are labeled with lowercase roman numerals (e.g., 'ii', 'iii', 'iv'); actions in which metrics are generated are labeled with 'M' (e.g., 'M1'); actions in which a clustering/classification step is taken are labeled with an uppercase S (e.g., 'S2').

A geoseismic cross-attribute clustering algorithm can be composed of four steps (FIG. 4): (401) within—seismic-attribute clustering; (402) identification of an 'anchor' attribute and 'subordinate' attribute(s); (403) linking subordinate-attribute objects to geocontextually related anchor-attribute objects (an object is a group of voxels that share a geophysical attribute contextual relationship and that can be considered as a unit); and (404) identification of cross-attribute clusters. The algorithm has two sets of inputs: $N \geq 2$ seismic attribute datasets (i in FIG. 4) and $M \geq 1$ contextual datasets (ii and ix in FIG. 4), which provide additional contextual information about the relationships between different attributes (e.g., spatial location, localized dip and/or azimuth direction, unit normal vectors to local plane, geologic age volumes, etc.). The output of the algorithm can be a set of cross-attribute clusters and their composite properties (xii). Each cross-attribute cluster is an object that is composed of a set of attribute objects that share contextual relationships that are consistent with prospectively for hydrocarbons. This output can be used to identify and rank regions in the subsurface that have a relatively high likelihood of being hydrocarbon reservoirs.

In step 401, an initial within-attribute clustering can be performed on each of the N attribute datasets (i). For each attribute i, the method employs a custom proximity measure that is a function of the attribute data (i) and additional contextual data (ii) as the proximity measure for the selected clustering algorithm (S1). The clustering algorithm used can be one of many clustering algorithms (e.g., K-means [Steinhaus, 1957; MacQueen, 1967] or one of its myriad variations; a k-nearest neighbor algorithm; density-based clustering such as DBSCAN [Ester et al., 1996]; etc.). It is noted that the clustering algorithm chosen need not be a 'formal' unsupervised clustering algorithm. The use of "clustering, or "clustering algorithm" herein is intended to refer to and cover any algorithm (e.g., a classification algorithm, clustering algorithm, etc.) that effectively groups raw data points into sets that are near to each other (where 'near' is defined by the proximity measure [M1] that is used), and "cluster" is intended to refer to any grouping generated such algorithms.

At the end of step 401, the user has, for each attribute, a collection of attribute objects (iii), each of which is made up of one or more clusters of voxels in the given attribute dataset.

In step 402, the method can use all N within-attribute clustered datasets (iv) as input to step 402. Step 402 includes the identification (S2) of an anchor attribute (vi) from among the N attributes and considers the remaining N−1 attributes to be 'subordinate' attributes (v). The key characteristic of an anchor attribute is the existence of quantifiable contextual relationships between the 'anchor' attribute and each one of the 'subordinate' attributes. Contextual relationships are something that is consistently true about the relationship between two objects in a given context. For example, in hydrocarbon reservoirs, a hydrocarbon-fluid-signature attribute object occurs within a reservoir-rock attribute object (i.e., the contextual relationship between fluid signature and reservoir rock is 'contained within'). Additional items to be considered are spatial smoothness and continuity of the anchor attribute, signal-to-noise ratio of the anchor attribute (higher is more favorable), and spatial coincidence with the potential reservoirs themselves.

Step 403 includes linking (i.e., grouping as part of the same multi-attribute object) related subordinate-attribute objects to anchor-attribute objects. For each of the N−1 subordinate attribute—anchor attribute pairs, the method can employ a clustering or classification algorithm (S3) that is deemed well suited to the problem (e.g., k-means clustering where the number of clusters k=2) to perform cross-attribute linking between the anchor-attribute object (viii) and the object for each subordinate attribute j (vii).

For all anchor-attribute—subordinate-attribute pairs, S3 in step 404 of FIG. 4 can include the following steps. Objects of a subordinate attribute j (vii) can be associated with one or more objects of the anchor attribute (viii). Each individual object of the anchor attribute is separately linked with any nearby subordinate-attribute object according to a proximity measure (M3) that is a function of subordinate attribute j (vii) and contextual information (ix) that is derived from one or more of the M contextual datasets (contextual data is secondary data that describes primary data (information)).

The function describing the proximity measure (M3) that links an anchor-attribute object to a subordinate-attribute object can (and frequently does) change between anchor-attribute—subordinate-attribute pairs, as user-defined context dictates. One of the primary reasons why the present technological advancement can be applied with computational efficiency is that the algorithm is amenable to computational adjustments that enable representative points to be used to compute the proximity between subordinate-attribute objects and related anchor-attribute objects. The most computationally intensive method for doing this is to compute the point-to-point distance between all points in the subordinate-attribute object and all points in the anchor-attribute object (and using a threshold to define whether that subordinate-attribute object is indeed to be associated with an anchor-attribute object). The least computationally intensive method for relating subordinate and anchor attribute objects is to use a single representative point (e.g., the Euclidean centroid) for both objects as inputs to compute a proximity measure. Many intermediate-complexity methods that leverage contextually appropriate data reduction can be chosen, depending on available computing resources and complexity of the attribute-object shapes. The representative points can be chosen by any method—they don't technically have to be centroids; they just have to be representative for whatever context being working in. The example provided herein does use centroids, but one alternative would be to use the voxel contained within the object that had the highest value of the given attribute.

Figure 5A:
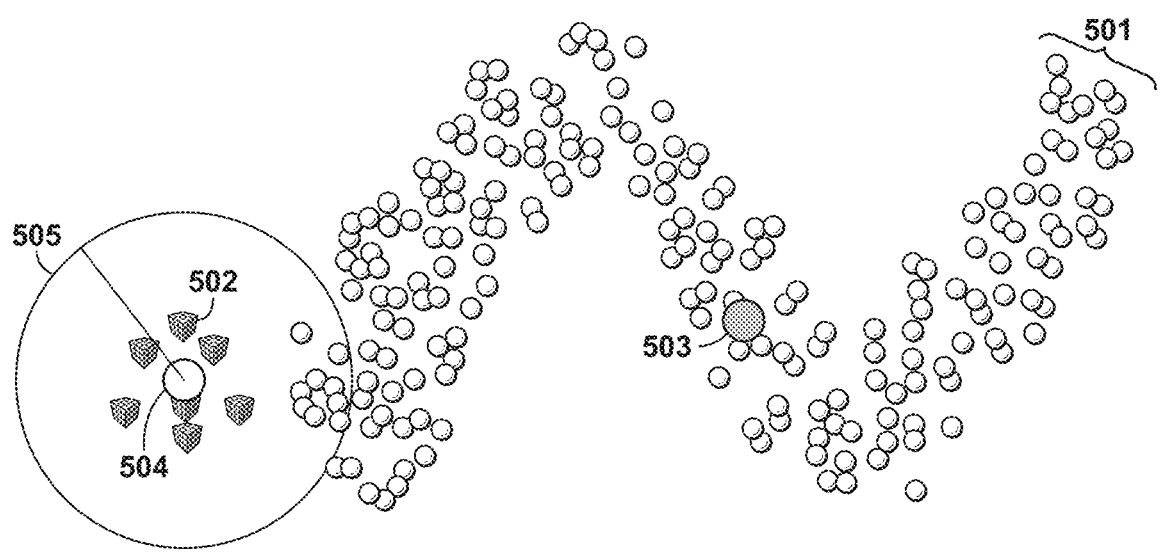
FIGS. 5A and 5B is a schematic example of a situation in which multiple representations of the distance between an anchor-attribute object and subordinate-attribute object is warranted.
Figure 5B:
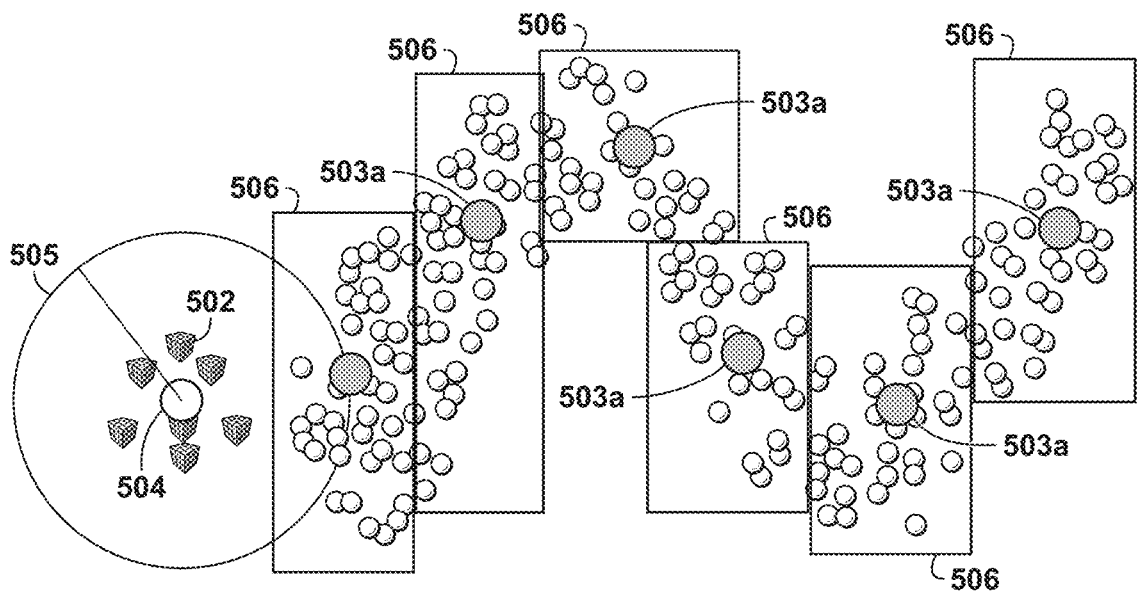

For the purposes of illustration of one such data-reduced approach, a case in which the only contextual data is used to link anchor and subordinate attribute objects are the attribute objects' position in Cartesian space is described with respect to FIGS. 5A and 5B. In both FIGS. 5A and 5B, the group of smaller spheres (or circles in the 2D representation of the FIG. 501 are an anchor-attribute object, and the group of cubes 502 are a subordinate-attribute object. The 'centroid' for the anchor attribute 501 is shown as a circle 503; the centroid for the subordinate attribute is circle 504. The threshold distance (below which an anchor-attribute object and a subordinate-attribute object are considered associated/linked) is represented by the circles 505 with radius 'Threshold distance'. Uncertainty in threshold distance can be incorporated into the function that defines proximity, which can be of varying complexity as context dictates. Note that in FIG. 5A, in which only one location is used to represent the position of the anchor-attribute object 501, the distance between the single point used to represent the subordinate-attribute's location and the single point used to represent the anchor-attribute object's location are beyond the threshold distance for association. In FIG. 5B, however, a subsetting of the anchor-attribute object 501 enables six different locations 503a to be considered as input to the distance function between the subordinate-attribute object and the anchor-attribute object. Use of this method for distance computation enables the algorithm to 'see' that the subordinate-attribute object should indeed be associated with the irregularly shaped anchor-attribute object.

The Cartesian-space centroid 504 of each subordinate-object C 502 is used as the representative point for the object. To reduce data size but still account for anchor-attribute objects that have irregular, non-spherical shapes of the anchor-attribute objects, each anchor-attribute object A 501 is subdivided into q subsets of voxels ($[A_1, A_2, \ldots, A_q]$) 506 using a data-partitioning algorithm such as Octree (Meagher, 1980); the Cartesian-space centroid 503a of each subset $A_i$ is used as the representative point for that subset. The proximity measure $D(C, A_i)$ is computed for each of the q subsets 506; if one or more of the q computed proximity measures are smaller than the threshold 505, then the subordinate-attribute object C 502 is considered to be associated with anchor-attribute object A. It is noted that any method for implementing step 403 can be used so long as it preserves the contextually relevant meaning of proximity.

In step 404, S4, the objects of any subordinate attribute that have been linked to the same anchor-attribute object (xi) are deemed to be part of a single cross-attribute cluster (xii). By definition, each cross-attribute cluster contains only one anchor-attribute object, but it may contain more than one subordinate-attribute object. It is noted that an anchor attribute that is associated with only a subset of subordinate attributes (as a result of locally missing and/or noisy data) is still able to be put forth as a potentially prospective region (although appropriate ranking algorithms would rank it less favorably). If the anchor-attribute data is believed to be of either globally or locally poor quality, then practitioners may consider either using a different attribute as the anchor and/or applying the algorithm more than once, each time using a different attribute as anchor.

EXAMPLE

A non-limiting application of the present technological advancement to a synthetic seismic dataset is described. The synthetic dataset was built to represent a complete set of seismic images of a subsurface hydrocarbon reservoir contained in a buried, sand-filled river channel.

Figure 6A:
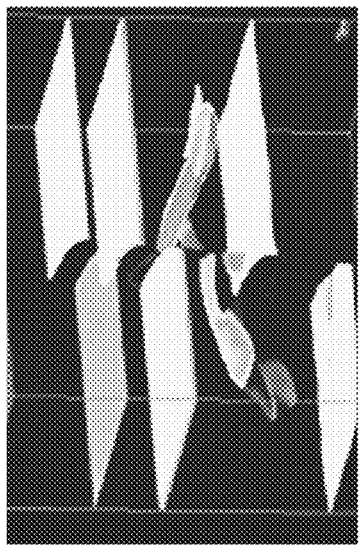
FIGS. 6A, 6B, and 6C are exemplary vertical cross-sections of seismic attributes from a synthetic seismic data volume imaging a hydrocarbon system containing channelized-sand reservoirs.
Figure 6B:
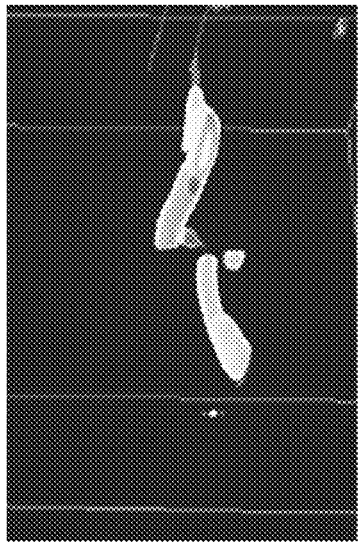
Figure 6C:
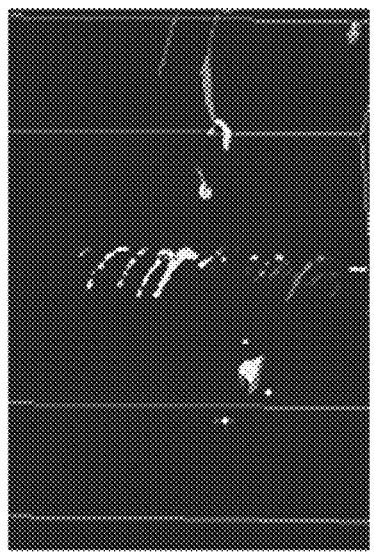

In this example, we use N=3 input attributes (FIG. 6); however, it should again be noted that the invention described here can be used with any number N≥2 input attributes. FIG. 6A illustrates Amplitude Strength (the 'anchor' attribute); FIG. 6B illustrates Near-vs-far amplitude-vs-offset; and FIG. 6C illustrates a 'flat event' attribute that identifies areas in which local geometry is horizontal relative to the Earth surface. In FIGS. 6A and B, darker shades indicate higher attribute values; in FIG. 6C, lighter/whiter color indicates higher attribute values.

FIGS. 6A-6C shows the same vertical cross section through each of the three seismic-attribute volumes, each of which was generated using the same raw seismic data as input. The seismic attributes used are amplitude strength (AS) (FIG. 6A), which often corresponds to reservoir rock, among other features; an attribute derived from the amplitude-vs-offset (AVO) of near and far seismic stacks (FIG. 6B), which has larger values in regions where fluid properties are consistent with those of hydrocarbons; and a flat-event (FE) attribute that highlights regions in which there is a locally continuous plane that is normal to the local gravity field (FIG. 6C), which occurs, among other settings, where there is an oil-water contact or a gas-oil contact. In this example, four contextual datasets are used (M=4): (1-3) the x, y, and z spatial positions of each data point (not shown); and (4) a data volume containing normal vectors to the plane of the local geologic layer (not shown). In other applications of the present technological advancement, any number of relevant contextual datasets (M≥1) can be used.

In accordance with step 401, the method finds clusters within attributes for the three input seismic attributes using a modified k-means clustering algorithm with the following equation defining the distance D (M1) between voxel u and voxel v:

$$D(u, v) = \sqrt{g_a((a_u - a_v)^2) + g_x((x_u - x_v)^2) + g_y((y_u - y_v)^2) + g_z((z_u - z_v)^2)} \quad (1)$$

In Equation 1, $a_u$ is the value of the attribute at data point u, which is at spatial location $(x_u, y_u, z_u)$ in Cartesian space; $a_v$ is the value of the attribute at data point v, which is at spatial location $(x_v, y_v, z_v)$ in Cartesian space; and $g_a$, $g_x$, $g_y$ and $g_z$ are functions that take into account the relative importance of the attribute value, x position, y position, and z position. In this case, all four g functions are the identity function, which means that the spatial coherence of attribute values bears equal importance to proximity along a spatial dimension. However, Cartesian space does not necessarily need to be used as the present technological advancement is applicable to other coordinate systems and the four g functions can each have different values.

We then further merge the initial set of within-attribute clusters by using a truncated k-nearest neighbors (kNN) classification using the following, additional proximity measure (M1):

$$D(U, V) = I_n I_t \sqrt{(x_U - x_V)^2 + (y_U - y_V)^2 + (z_U - z_V)^2} \qquad (2.1)$$

$$I_n = \begin{cases} 1 & \text{if } (\vec{n_U} \cdot \vec{n_V}) > b \\ \infty & \text{otherwise} \end{cases} \qquad (2.2)$$

$$I_t = \begin{cases} 1 & \text{if } (x_U - x_V) < d_{threshold} \\ \infty & \text{otherwise} \end{cases} \qquad (2.3)$$

This is an example where step 401 is actually composed of a two-part 'clustering' algorithm (i.e., first apply modified k means, then further lump clusters using a kNN classification. In Equations 2.1, 2.2, and 2.3, U and V are separate clusters resulting from the initial within-attribute clustering step. As part of our data reduction to increase computational speed, $x_U$, $y_U$, and $z_U$ are the mean x, y, and z locations of cluster U; $x_V$, $y_V$, and $z_V$ are the mean x, y, and z locations of cluster V; $\vec{n_U}$ is the mean of the unit normal vectors in cluster U; and $\vec{n_V}$ is the mean of the unit normal vectors in cluster V. $d_{threshold}$ is the threshold distance beyond which linkages between clusters are not considered; b is the threshold for considering two average normal vectors to be similar.

For other use cases of the present technological advancement, any other relevant proximity measure can be used; for example, given a corresponding geologic age volume, one might construct a proximity measure that favorably weighted Euclidian distances within geologic layers of the same geologic age.

In this example, the relatively continues and low-noise amplitude strength (AS) is selected as the 'anchor' attribute, making the FE (flat event) attribute and the AVO attribute the 'subordinate' attributes (Step 402 in FIG. 4A). In other applications of the invention, a different attribute may be chosen as the 'anchor.' In the example provided here, amplitude strength has a definable contextual relationship with both flat events and areas of AVO strength.

The subordinate-attribute objects (FE and AVO) are linked to anchor-attribute objects (AS) (Step 403 in FIG. 4B). For the linking of both subordinate attributes, a simple binary classification algorithm can be used, classifying each subordinate-attribute object as linked or not linked to a given anchor-attribute object if the subordinate-attribute object is within a threshold distance of the anchor-attribute object. To increase the computational speed of the object linking step, before computing the distance between the subordinate and anchor objects, we subdivide each the anchor-attribute object using an Octree algorithm, one of many available data-partitioning algorithms, which allows us to effectively follow the irregular shape of the AS objects when linking subordinate- and anchor-attribute objects. The proximity of the centroid of each subset to the anchor-attribute object the centroid of each subordinate-attribute object can be computed. A myriad other data-reduction techniques could be used to facilitate rapid linking.

When linking the AVO objects to the anchor-attribute objects, a standard Euclidean distance threshold can be used:

$$\sqrt{(x_S - x_{A,i})^2 + (y_S - y_{A,i})^2 + (z_S - z_{A,i})^2} < d_{AVO} \qquad (3)$$

In Equation 3, $x_S$, $y_S$, and $z_S$ are the mean Cartesian coordinates for an AVO object and $x_{A,i}$, $y_{A,i}$, and $z_{A,i}$ are the mean Cartesian coordinates for the ith Octree-subsetted component of the AS anchor-attribute object. $d_{AVO}$ is the threshold distance for considering an AVO subordinate-attribute object linked with a given AS anchor-attribute object.

When linking the flat-event objects, we use a distance threshold that uses the normal-vector volume to favor within-layer distances. The proximity measure expressed in Equation 4 allows us to effectively search along the same geologic layer for flat events that may indicate an oil-water contact, a gas-oil contact, or a gas-water contact that are associated with an irregularly shaped reservoir-rock attribute object.

$$(2 - (\vec{n_S} \cdot \vec{n_{A,i}})) \sqrt{(x_S - x_{A,i})^2 + (y_S - y_{A,i})^2 + (z_S - z_{A,i})^2} < d_{FE} \qquad (4)$$

In Equation 4, $x_S$, $y_S$, $z_S$, $x_{A,i}$, $y_{A,i}$, and $z_{A,i}$ are as defined for Equation 3; $\vec{n_{A,i}}$ is the mean unit normal vector of the unit normal vectors for the voxels that compose the ith Octree-subsetted component of the AS anchor-attribute; $\vec{n_S}$ is the mean unit normal vector for the voxels composing the FE subordinate-attribute object; $d_{FE}$ is the distance threshold below which an subordinate-attribute object is considered linked to an anchor-attribute object A.

Figure 7:
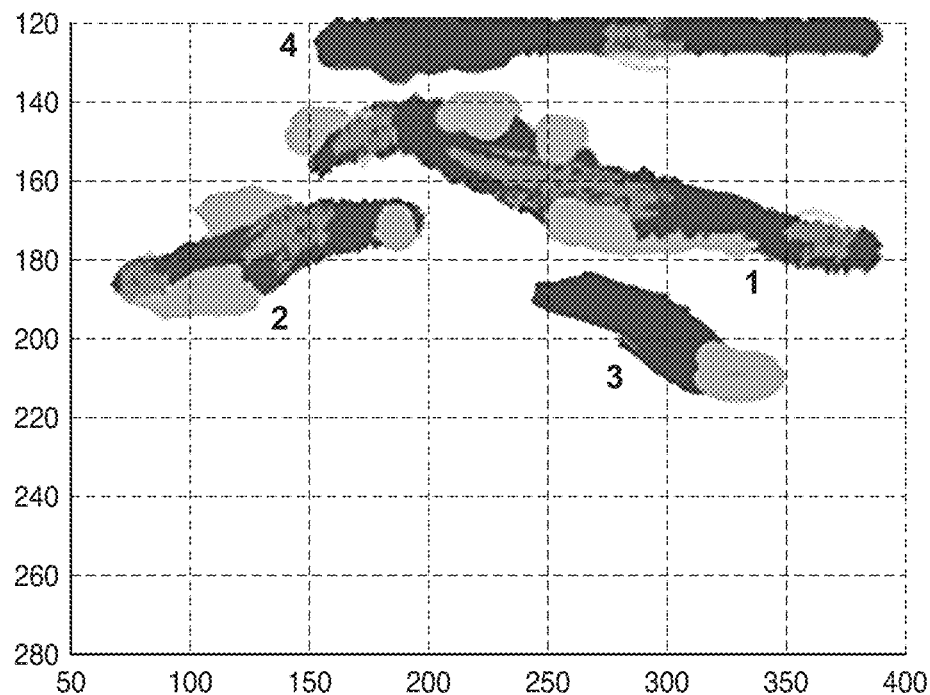
FIG. 7 is an exemplary vertical cross-section of linked hierarchical clusters of reservoir-rock objects, flat event objects, and AVO objects.

All subordinate-attribute objects of both types (AVO and FE) that are associated with each AS anchor-attribute object to identify the cross-attribute clusters that have characteristics consistent with prospectively for hydrocarbons (Step 404 in FIG. 4B) can be grouped. FIG. 7 provides a cross-section of the output volume; note that not all anchor attributes are associated with both FE and AVO subordinate-attribute objects.

The cross-section shown in FIG. 7 is from the same volume, but not the same location, as the cross sections shown in FIGS. 6A-C. The object ranked as 'most prospective' is object 1; second-most prospective, object 2; third-most prospective, object 3; and fourth-most, object 4. Note that an absence of one of the two subordinate attributes does not eliminate a given object from being ranked and considered as potentially prospective. Anchor-attribute (reservoir rock) objects are shown in the darkest shading; subordinate-attribute objects, flat-events and AVO, are shown in the medium shading and lightest shading, respectively.

The properties of the component voxels that make up each of the attribute objects in the cross-attribute clusters are used as input to a ranking algorithm which orders the cross-attribute clusters according to their prospectively. Ranking algorithms can vary in complexity. A simple ranking algorithm would rank as most prospective the attribute object containing the largest number of voxels; increasingly complex ranking algorithms might take into account the statistics of the attributes within the contained voxels. It is again noted that missing subordinate attributes (resulting from noisy or absent data) do not result in the elimination of a given anchor-attribute object from consideration as a potentially prospective volume.

In this example, it has been demonstrated how the present technological advancement, geoseismic cross-attribute clustering, automatically identifies prospective regions imaged in seismic data. The present technological advancement increases the effectiveness and efficiency of seismic interpreters, allowing them to quickly scan volumes for prospective regions, leaving them additional time to focus on regions of interest and reducing the chance that they will miss key regions of interest. The present technological advancement is easily modifiable to suit the contextual characteristics of a given problem. Furthermore, it is amenable to a host of data-reduction steps that make necessary computation time tractable and scalable. Finally, missing data does not eliminate a region from being considered as a potential hydrocarbon reservoir.

Furthermore, the cross-attribute clusters and their composite properties generated by the present technological advancement can be used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 8:
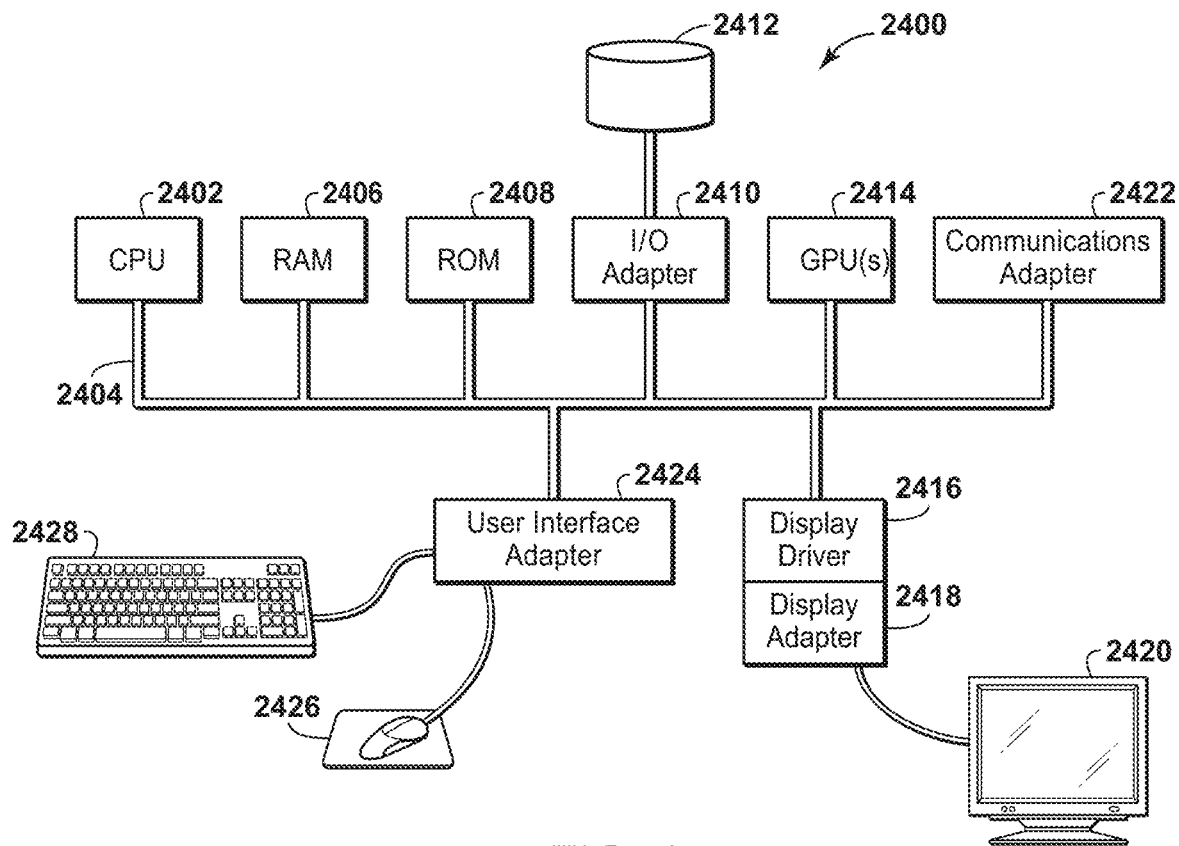
FIG. 8 is an exemplary computer upon which the present technological advancement may be implemented.

FIG. 8 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 8, additional CPUs may be present. Moreover, the computer system 2400 may comprise a networked, multi-processor computer system that may include a hybrid parallel CPU/GPU 2414 system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display driver 2416 and the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following publications are hereby incorporated by reference in their entirety:

Ester, Martin; Kriegel, Hans-Peter; Sander, Jörg; Xu, Xiaowei (1996), A Density-Based Algorithm for Discovering Clusters in Large Spatial Databases with Noise, Proc. Of 2nd Intl. Conf. on Knowledge Discovery and Data Mining;

Simoudis, Evangelos; Han, Jiawei; Fayyad, Usama M., eds. A density-based algorithm for discovering clusters in large spatial databases with noise. Proceedings of the Second International Conference on Knowledge Discovery and Data Mining (KDD-96). AAAI Press. pp. 226-231, ISBN 1-57735-004-9. CiteSeerX: 10.1.1.71.1980;

MacQueen, J. B. (1967). Some Methods for classification and Analysis of Multivariate Observations. Proceedings of 5th Berkeley Symposium on Mathematical Statistics and Probability 1. University of California Press. pp. 281-297. MR 0214227. Zbl 0214.46201, Retrieved 2009-04-07;

Meagher, Donald (October 1980). "Octree Encoding: A New Technique for the Representation, Manipulation and Display of Arbitrary 3-D Objects by Computer", Rensselaer Polytechnic Institute (Technical Report IPL-TR-80-111); and Steinhaus, H. (1957). "Sur la division des corps matériéls en parties". Bull. Acad. Polon. Sci. (in French) 4 (12): 801-804. MR 0090073, Zbl 0079.16403.

What is claimed is:

1. A method, comprising: performing, with a computer, within-seismic-attribute clustering for each of a plurality of seismic attribute datasets for N different attributes that each describes one of N different seismic attributes of a seismic data volume resulting from a seismic survey, N being greater than or equal to two, each of the seismic attributes corresponding to a measurable property or derivative of seismic data used to highlight or identify areas of geological or geophysical interest, by:

obtaining a plurality of seismic attribute objects that each include one or more clusters of voxels according to a clustering algorithm that partitions the voxels in each of the plurality of seismic attribute datasets into a set of sub-objects, each sub-object of the plurality of sub-objects including voxels that are near to each other as defined by a proximity measure;

identifying an anchor attribute and N−1 subordinate attributes from the N different attributes based on at least one quantifiable contextual relationship between the anchor attribute and each of the N−1 subordinate attributes;

linking, with a computer, objects within the seismic attribute datasets corresponding to the N−1 subordinate attributes to related objects within the seismic attribute dataset corresponding to the anchor attribute by iteratively performing N−1 iterations of pairwise cross-attribute clustering or classification between each of the remaining N−1 subordinate attributes, each iteration including:

Identifying a set of anchor attribute representative points, each anchor attribute representative point corresponding to a respective sub-object in the set of sub-objects associated with the anchor attribute;

Identifying a current subordinate attribute for a current iteration in the N−1 iterations;

Identifying a subordinate attribute representative point for the current subordinate attribute;

Determining a proximity metric that is a function of the current subordinate attribute and describes the contextual relationship between the current subordinate-anchor attribute pair;

Performing pairwise cross-attribute clustering or classification between the current subordinate attribute and the anchor attribute by:

computing a set of proximity metric values between the current subordinate attribute representative point and each representative point in the set of anchor attribute representative points, each proximity metric value corresponding to a respective sub-object in the set of sub-objects associated with the anchor attribute;

Comparing each proximity metric value in the set of proximity metric values to a predefined threshold;

Linking a nearby subordinate attribute object corresponding to the current subordinate attribute to the anchor attribute object, including all of the anchor attribute sub-objects, if any proximity metric value in the set of proximity metric values is less than the predefined threshold;

separately linking over the N−1 iterations each anchor attribute object with the nearby subordinate attribute object for each of the respective N−1 subordinate attributes of the anchor attribute, according to the proximity metric that is a function that changes between anchor attribute object and subordinate attribute object pairings;

identifying, with a computer, cross-attribute clusters, wherein the objects of any subordinate attribute that are linked to a same object of the anchor attribute are part of a single cross-attribute cluster;

performing a seismic acquisition, results from which are used to generate the plurality of seismic attribute data sets; using the cross-attribute clusters to identify subsurface regions that may be a hydrocarbon reservoir; and drilling a well for extracting hydrocarbons from the hydrocarbon reservoir.

2. The method of claim 1, wherein the anchor attribute is identified from the N attributes based at least on spatial smoothness of the anchor attribute, continuity of the anchor attribute, signal-to-noise ratio of the anchor attribute, or spatial coincidence between the anchor attribute and a potential hydrocarbon reservoir.

3. The method of claim 1, wherein the linking includes separately linking each object of the anchor attribute that is proximal to the objects within the seismic attribute data sets corresponding to the N−1 subordinate attributes according to the proximity metric that is a function of a respective subordinate attribute and contextual information.

4. The method of claim 1, wherein the representative points are centroids based on shapes of the objects for the N−1 subordinate attributes and shapes of the objects of the anchor attribute.

5. The method of claim 1, wherein each object of the anchor attribute is partitioned into a plurality of sub-objects using a centroid of a shape of each of the sub-objects as a representative point.

6. The method of claim 1, wherein each cross-attribute cluster is an object that includes a set of attribute objects that share contextual relationships that are consistent with prospectively for hydrocarbons.

7. The method of claim 1, further comprising generating a subsurface image that includes linked cross-feature hierarchical clusters of attributes corresponding to the plurality of seismic attribute data sets.

8. The method of claim 1, wherein the representative points are voxels contained within each of the objects that have a highest value of a given attribute.

9. The method of claim 1, wherein the within-seismic-attribute clustering includes using a classification algorithm.

* * * * *